US008805308B2

(12) United States Patent  
Schubert

(10) Patent No.: US 8,805,308 B2  
(45) Date of Patent: Aug. 12, 2014

(54) RADIO TRANSMISSION MODULES HAVING INTRINSIC SAFETY

(75) Inventor: Axel Schubert, Berlin (DE)

(73) Assignee: MSA Auer GmbH, Berlin (DE)

( * ) Notice: Subject to any disclaimer, the term of this patent is extended or adjusted under 35 U.S.C. 154(b) by 0 days.

(21) Appl. No.: 13/878,110

(22) PCT Filed: Oct. 5, 2011

(86) PCT No.: PCT/EP2011/067421  
§ 371 (c)(1),  
(2), (4) Date: Jul. 31, 2013

(87) PCT Pub. No.: WO2012/045795  
PCT Pub. Date: Apr. 12, 2012

(65) Prior Publication Data  
US 2013/0303094 A1 Nov. 14, 2013

(30) Foreign Application Priority Data  
Oct. 6, 2010 (DE) .......................... 10 2010 047 497

(51) Int. Cl.  
*H03C 1/62* (2006.01)  
*H04B 17/00* (2006.01)

(52) U.S. Cl.  
USPC .................. 455/115.1; 455/67.11; 455/127.1

(58) Field of Classification Search  
USPC ............. 455/67.11, 115.1, 127.1, 333, 456.4, 455/572  
See application file for complete search history.

(56) References Cited

U.S. PATENT DOCUMENTS 5,307,512 A     4/1994  Mitzlaff  
(Continued)

FOREIGN PATENT DOCUMENTS

DE            4291711 C2      3/1998  
DE            19719730 C1    10/1998  
(Continued)

OTHER PUBLICATIONS

International Preliminary Report on Patentability, International Application PCT/EP2011/067421, Apr. 9, 2013, International Bureau of WIPO, 6 pages, Geneva, Switzerland.

(Continued)

*Primary Examiner* — Quochien B Vuong  
(74) *Attorney, Agent, or Firm* — Ference & Associates LLC

(57) ABSTRACT

Described herein are arrangements and methods for achieving intrinsic safety for a radio transmission module. One aspect provides an apparatus for transmitting signals in an explosion-hazardous area with intrinsic safety, including: a radio transmission module having a high frequency module and an electronic control circuit disposed on a printed circuit board, said electronic control circuit being configured to control a voltage supply to the high frequency module in response to one or more of: output voltage of the high frequency module exceeding a predetermined voltage value, as independently measured by at least two independently operating hardware circuits; and a temperature of a heat-conducting potting compound potted over heat generating components disposed on the printed circuit board exceeding a predetermined temperature value, as independently sensed by at least two independently operating temperature circuits. Other embodiments are described.

19 Claims, 4 Drawing Sheets

(56) References Cited

U.S. PATENT DOCUMENTS

| | | | |
|---|---|---|---|
| 6,366,436 B1 * | 4/2002 | Maier et al. | 361/93.9 |
| 6,476,520 B1 | 11/2002 | Bohm et al. | |
| 6,643,519 B1 * | 11/2003 | Lundgren | 455/505 |
| 6,718,164 B1 * | 4/2004 | Korneluk et al. | 455/115.1 |
| 6,954,620 B2 * | 10/2005 | Rotta et al. | 455/115.1 |
| 7,091,631 B2 | 8/2006 | Junker | |
| 7,206,567 B2 * | 4/2007 | Jin et al. | 455/404.1 |
| 7,340,225 B2 * | 3/2008 | Bielmeier et al. | 455/115.1 |
| 2006/0077612 A1 | 4/2006 | Kothari et al. | |

FOREIGN PATENT DOCUMENTS

| | | |
|---|---|---|
| DE | 10152653 B4 | 6/2005 |
| DE | 102006006578 A1 | 8/2007 |
| WO | 199633555 A1 | 10/1996 |

OTHER PUBLICATIONS

International Search Authority, Search Report for International Application PCT/EP2011/067421, Jan. 30, 2012 (EPO), 1 page, Rijswijk, NL.

Schultz, Stephan, "Wireless Goes Process Automation—Challenges in Hazardous Areas", Electrical and Instrumentation Applications in the Petroleum & Chemical Industry (4th European Conference on), 2007, PCIC Europe, 8 pages (including separate abstract page).

\* cited by examiner

RADIO TRANSMISSION MODULES HAVING INTRINSIC SAFETY

TECHNICAL FIELD

The subject matter described herein generally relates to safety in the use of radio transmission modules in explosion-hazardous areas.

BACKGROUND

Ensuring safety in connection with use of equipment in certain areas is important. For example, equipment used in parts of a plant or work environment that are declared as explosion-protected areas should satisfy certain requirements that are laid down in safety standards. One example protection technique for operating equipment in an explosion-protected area is the so-called "intrinsic safety" technique. In this technique, the energy supplied to electrical equipment is limited such that no ignitable spark can be produced, even though the environment may contain an explosion-prone environment (combustible gas and oxygen). To limit energy produced by the device that may cause ignition of a combustion reaction/explosion, both current and voltage may need to be limited.

Intrinsically safe equipment is defined in safety standards (for example, ISA-60079-11 (12.02.01)-2009) to be equipment that can not release energy to cause ignition of a hazardous mixture in an easily ignited concentration. This may be accomplished by limiting the amount of power to be below a level that will ignite the gases. Moreover, each device that is "intrinsically safe" may be certified for differing levels of hazardous environments. Thus, a device should only be used in an environment matching its safety certification.

In a given environment a distinction may be made between different zones. For example, in certain zones, such as Zone 0 of the Intrinsic Safety Standard, a permanently explosive atmosphere is assumed. Other zones are described in the safety standards (Zone 1, Zone 2). Many jurisdictions (United States, Canada, European Union, et cetera) have adopted certification standards for devices to be used in such zones, thereby providing classification to the devices. In such an area where an explosive environment is presumed, there is exclusively permitted a resistive limitation of the current by one or more resistors which also satisfy certain safety requirements.

The functionality or availability of assemblies can also be increased considerably in an explosion-protected area when the assemblies are used redundantly or with multiple redundancy, wherein one assembly is active and further assemblies are on standby. Thus, if a fault occurs in an active assembly, a switchover to the further assemblies is effected automatically. The assemblies used may be active at the same time.

A device for the intrinsically safe redundant current-voltage supply for one or more electric loads in an explosion-protected area is known. This device includes at least two supply circuits for providing the current/voltage supply with a protection means for the intrinsically safe power limitation of the current supplied. As part of the protection means, the supply circuits each contain means for current regulation and/or limitation. Outside the explosion-protected area, a means for the resistive current limitation is connected in series to the supply circuits as further part of the protection means. The means for the resistive current limitation is arranged between the supply circuits and the explosion-protected area.

SUMMARY

One aspect provides an arrangement for achieving intrinsic safety of a radio transmission module with an HF power stage (RF-P) and an electronic control unit (Se) on a board for transmitting signals and measured values in an explosion-hazardous area, which includes an external voltage supply, an antenna connector (Aa) and an input connector, characterized in that at the base of an antenna (A) at least two independently operating hardware circuits (P1, P2, P3) are arranged for rectification of output voltage of the HF power stage (RF-P) and for comparison with a maximum admissible value, each comprising one rectifier circuit (GL1, GL2, GL3) and one comparator (K1, K2, K3) whose outputs are connected via a control circuit (Se) with a limiter circuit (Bgr) for switching off voltage supply or for limiting output power of the radio transmission module to a maximum admissible value.

Another aspect provides a method for achieving intrinsic safety of a radio transmission module with an HF power stage (RF-P) and an electronic control unit (Se) on a board for transmitting signals and measured values in an explosion-hazardous area, characterized by the following steps: monitoring HF output power at an antenna (A) by at least two independently operating hardware circuits (P1, P2, P3) by rectifying HF output voltage; comparing the rectified HF voltage with a maximum admissible value; acting on voltage supply of the radio transmission module to avoid an excessive ignition energy upon exceedance of the rectified HF voltage and/or potting an entire circuit board with a heat-conducting potting compound over components in a minimum layer thickness possible according to a standard; measuring a temperature in the potting layer by at least two independently operating hardware circuits (T1, T2, T3) distributed over the circuit board; comparing the measured temperature with an admissible limit value of the temperature inside the potting compound; and acting on the voltage supply of the radio transmission module to avoid an excessive power loss upon exceedance of the admissible limit value of the temperature.

A further aspect provides an apparatus for transmitting signals in an explosion-hazardous area with intrinsic safety, comprising: a radio transmission module having a high frequency module and an electronic control circuit disposed on a printed circuit board, said electronic control circuit being configured to control a voltage supply to the high frequency module in response to one or more of: output voltage of the high frequency module exceeding a predetermined voltage value, as independently measured by at least two independently operating hardware circuits; and a temperature of a heat-conducting potting compound potted over heat generating components disposed on the printed circuit board exceeding a predetermined temperature value, as independently sensed by at least two independently operating temperature circuits.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DESCRIPTION OF EMBODIMENTS

Figure 1:
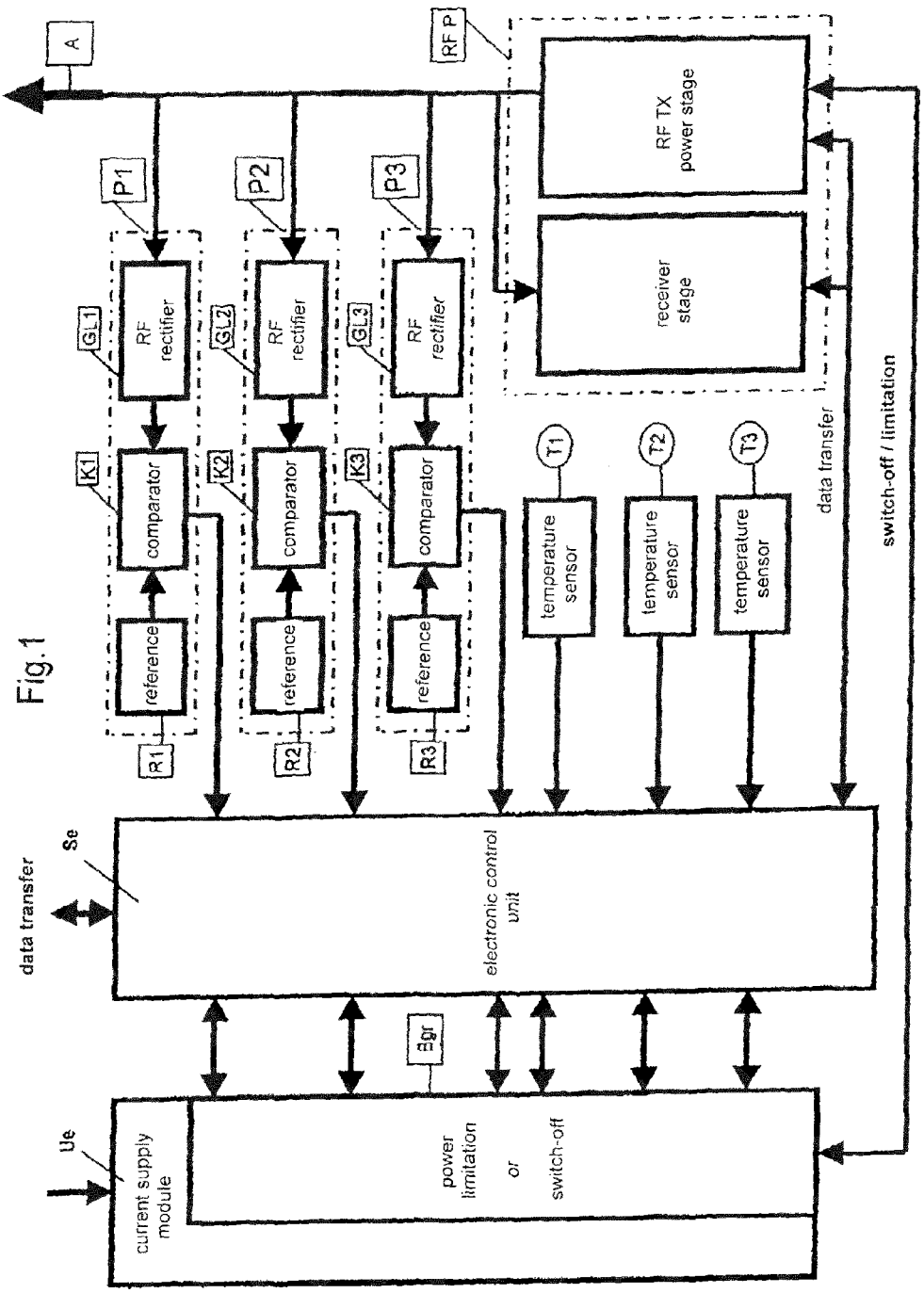
FIG. 1 illustrates a block diagram of an example radio transmission module.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation.

Embodiments provide arrangements and/or methods for achieving intrinsic safety of a radio transmission module for transmitting signals and measured values in an explosion-hazardous area, with high safety and using small size/spatial dimensions.

The design of a radio transmission module, also referred to below as RF (radio frequency) module, for use in explosion-hazardous areas, such as areas with the protection class Intrinsic Safety "i", is greatly impaired with respect to its spatial dimensions by the specifications in the corresponding standards. Two features substantially complicate providing a small design: (1) safe limitation of the ignition energy by the antenna power and coupling of the antenna, and (2) reduction of power loss of the RF power stage and of the control electronics.

The RF output transmitting power of an intrinsically safe configuration presently is limited to a power of 1.3 W. In case of a fault, the antenna transmission power of an RF power stage can deliver more than the admissible transmission power, as for example in normal operation, and thus represents a possible ignition source if used in a hazardous environment.

Currently, the RF power stage consists of an integrated single-chip solution that is controlled by a microcomputer/micro-controller. Monitoring of the RF power stage by the microcomputer or the RF power chip can not be ensured, due to the possibility of a fault of the microcomputer or of the RF power chip in power control. Thus, power control by the microcomputer (in accordance with intrinsic safety) should be configured in a redundant manner for the case of fault "ib", or in a triple redundant manner for the case "ia". This means a substantial increase in the number of components, and in addition a diversity in the design of the software and/or of the hardware of the micro-controller, for example when the safety integrity level SIL 2/3 must be satisfied. Currently, a case of fault in the RF power chip has not even been taken into account and is not currently treatable in a failsafe manner.

A RF output power limitation at the antenna is possible by incorporating an ohmic resistor for the intrinsic safety "ia". Incorporating ohmic resistors in the antenna line is useful for reasons of explosion protection, but greatly restricts the high frequency (HF) function of the antenna and thus of the circuitry.

For the intrinsic safety "ia", incorporating a capacitive separation of the antenna from the power stage requires a series connection of three capacitors with a high dielectric strength and spatial distances that likewise impair the high frequency function of the device. This is especially true at frequencies in a range of about 100 MHz or more. This also no longer provides for a circuit design of limited spatial dimensions.

Accordingly, embodiments provide a radio transmission module including arrangements to monitor and regulate power using arrangements of limited spatial design, which achieve intrinsic safety for transmitting signals and measured values in an explosion-hazardous area. For example, in accordance with an embodiment, for a required intrinsic safety "ib" two, and for "ia" three, independently operating hardware circuits are arranged at the base of the antenna for rectification of the output voltage of the HF (high frequency) power stage. These hardware circuits are used for comparison with a maximum admissible value with one rectifier circuit and one comparator each, whose outputs are connected with a limiter circuit for switching off the voltage supply or for limiting the output power of the radio transmission module to a maximum admissible value.

As another example, in accordance with an embodiment, the entire circuit board (components) is potted over with a heat-conducting potting compound in a minimum layer thickness. The minimum layer thickness is used to permit measuring the temperature in the potting layer and for comparing the measured temperature with an admissible limit value inside the potting compound. In an embodiment, at least two independently operating hardware circuits distributed over the circuit board are arranged, each comprising one temperature measuring circuit and one comparator. The comparator may be part of the temperature sensor. Via a control circuit, the outputs of the comparators are connected with a limiter circuit for switching off the voltage supply, or for limiting the input and/or output power of the radio transmission module to a maximum admissible value. This is done in order to avoid an excessive power loss upon exceedance of the admissible limit value of the temperature.

An example method according to an embodiment may include the following steps. The HF output power at the antenna is monitored by at least two independently operating hardware circuits. This may be accomplished by rectifying the HF output voltage. The rectified HF voltage is compared with a maximum admissible value. The voltage supply of the radio transmission module may be acted on to avoid excessive ignition energy upon exceedance of the maximum admissible value by the rectified HF voltage.

The entire circuit board may be potted over with a heat-conducting potting compound, with the components being potted over in a minimum layer thickness possible according to an applicable safety standard. The temperature in the potting layer may be measured by at least two independently operating hardware circuits distributed over the circuit board. The measured temperature may be compared with an admissible limit value of the temperature inside the potting compound. The voltage supply of the radio transmission module may be acted on to avoid an excessive power loss upon exceedance of the admissible limit value of the temperature.

In an embodiment, both monitoring the HF output power and potting the entire circuit board is performed in a radio module. In case of lower safety demands, one of the two measures may be sufficient. In a radio transmission module having one or more of the described characteristics of the embodiments may thus provide intrinsic safety for transmitting signals and measured values in an explosion-hazardous area with little effort and at small dimensions.

The illustrated example embodiments will be best understood by reference to the figures. The following description is intended only by way of example, and simply illustrates certain example embodiments.

According to the block circuit diagram of the example radio transmission module as illustrated in FIG. 1, the transmission energy of the RF power and receiver stage RF-P (high frequency module) is emitted via an antenna A. For monitoring the RF antenna output power, RF power measurement modules P1, P2, P3, configured in triple form in accordance with an intrinsic safety "ia", which may be configured in double form in accordance with an intrinsic safety "ib", are employed. RF rectifier(s) GL1, GL2, GL3 rectifies the RF output voltage for comparison of the rectified RF signal and the signal of a reference R1, R2, R3, by means of a comparator (three are illustrated, K1, K2, K3).

In response to an exceedance of the rectified RF voltage, a limiter circuit Bgr is actuated via a control circuit (electronic control unit) Se, which interrupts the input voltage Ue of a power supply module of the RF module and/or reduces the same to an ignition-safe input power. Via the control circuit Se, a data transfer is effected with a functional unit supplying the signals and/or measured values to be transmitted (data transfer). In the control circuit Se the signals are processed and prepared for transmission to the RF power and receiver stage RF-P.

Figure 2:
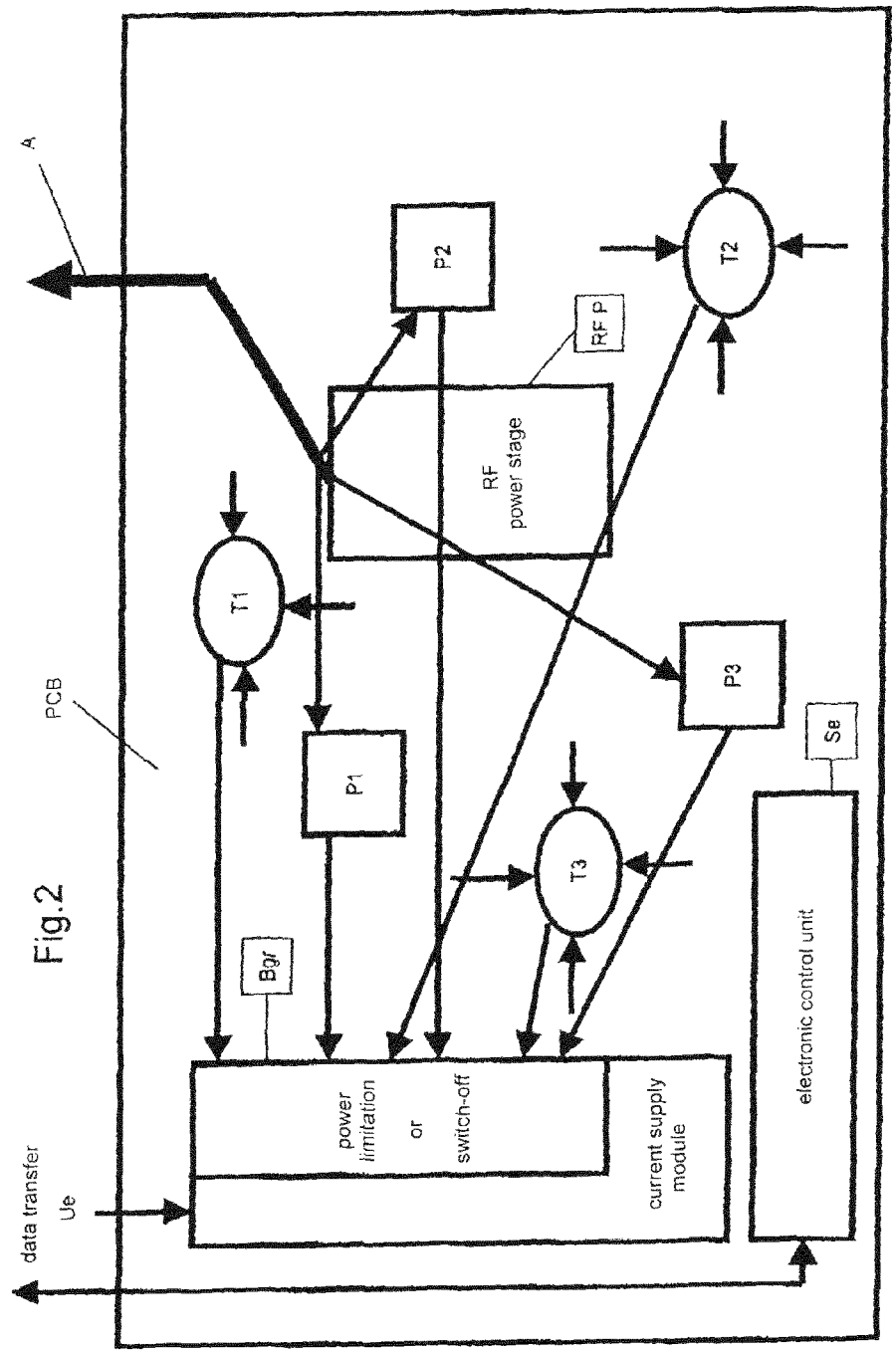
FIG. 2 illustrates an example radio transmission module.

The two or three redundant hardware circuits P1, P2, P3 operate independently and reliably ensure a power reduction or switch-off in case of one or two faults. FIG. 2, described further below, illustrates a view of an example arrangement of the individual modules and their connections on the board. As can be gathered from FIG. 3, the modules may be arranged on both sides of the printed circuit board PCB. Beside the limitation of the RF output power, the surface temperature of the RF module is a possible further ignition source in case of a fault. For an approval of the RF module, for example, according to temperature class T4=135° C., it is to be ensured that in case of a fault this temperature limit is not exceeded, as described in the standard.

For a RF output power in the range from about 0.5 W up to the admissible limit power, however defined in an applicable safety standard, DC power is required for the HF module. This may generate surface temperatures (at the components) above the T4 limit, and thus necessitate additional measures that manage/lower this temperature. Possible measures include use of heat sinks that may be introduced to reduce the surface temperatures and potting of components or the entire circuitry with a heat-conducting potting compound, which reduces the surface temperatures. However, both cases may introduce a considerable spatial increase of the RF module.

Figure 3:
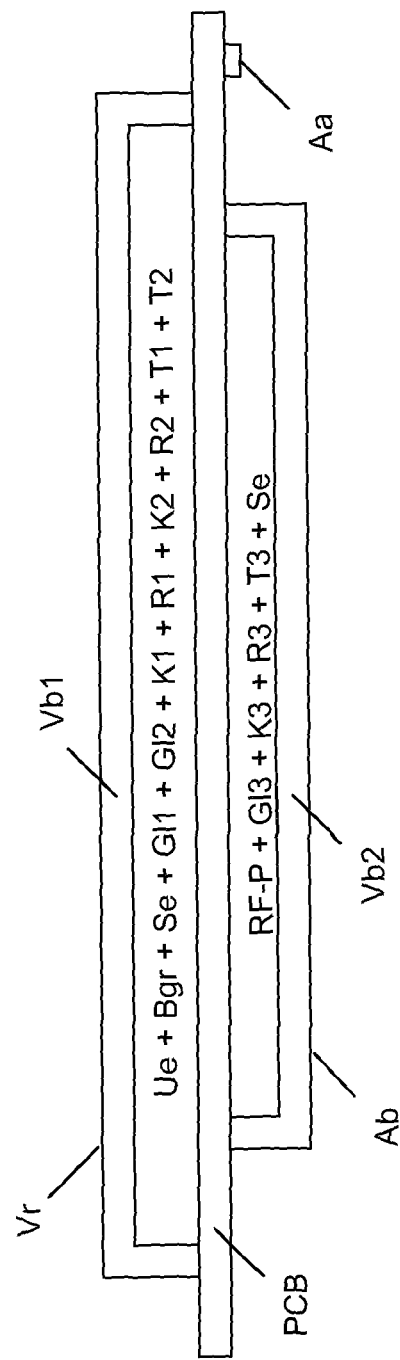
FIG. 3 illustrates a side view of an example radio transmission module.

As such, an embodiment provides for reducing the surface temperatures by employing alternative means. For example, an embodiment provides for potting the entire circuitry with a potting compound that only has the minimum required layer thickness, which is provided over the components according to an applicable safety standard. As illustrated in FIG. 3, the potting compound encloses the modules arranged on both sides of the PCB and forms one potting area Vb1, Vb2 on the upper and lower surface of the PCB, respectively. Since this layer thickness may not sufficiently provide the necessary reduction of heat in a case of a fault, further measures may be required.

For example, another measure includes using the double (ib) or triple (ia) hardware-based temperature circuit T1, T2, T3, illustrated in detail in FIG. 1 and FIG. 2. As illustrated in FIG. 2, hardware-based temperature circuits T1, T2, T3, measure the temperature in the potting layer, which may be distributed over the entire printed circuit board. The temperature is compared in a comparator, which may be implemented in temperature circuits T1, T2, T3. In response to exceedance of the admissible limit value of the temperature inside the potting compound, the comparator may interrupt the input voltage supply of the RF module, or reduce the same to an ignition-safe input power. The two or three redundant hardware-based temperature circuits T1, T2, T3 operate independently and reliably ensure a power reduction or switch-off in case of one or two faults.

As illustrated in FIG. 3, elements Ue, Brg, Se, Gl1, Gl2, Gl3, K1, K2, K3, R1, R2, R3, T1, T2, T3 and RF-P may be provided on opposing sides of PCB, along with an antenna connector Aa. In addition, a potting frame Vr may be provided. A shielding plate Ab may be soldered or otherwise attached to the PCB for shielding HF radiation. This shielding plate Ab may be arranged on the side of the PCB, in which the RF power and receiver stage RF-P also may be potted. This shielding plate Ab additionally acts as cooling plate.

Figure 4:
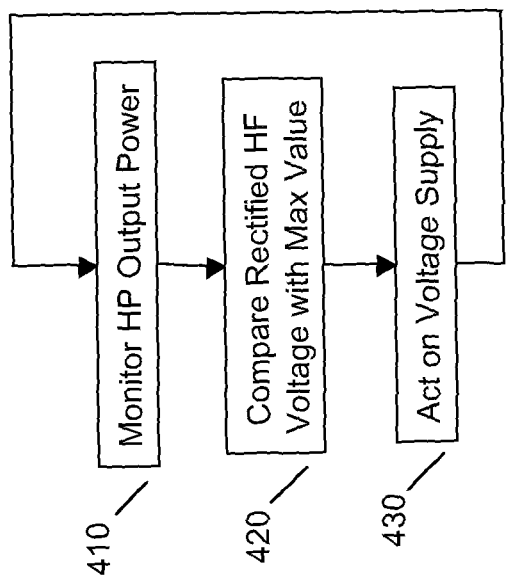
FIG. 4 illustrates an example method of providing an intrinsically safe radio transmission module.

Illustrated in FIG. 4 is an example method according to an embodiment. A HF output power at the antenna is monitored 410 by at least two independently operating hardware circuits. This may be accomplished by rectifying the HF output voltage. The rectified HF voltage is compared 420 with a predetermined maximum admissible voltage value. The voltage supply of the radio transmission module may be acted on 430 to avoid excessive ignition energy upon exceedance of the predetermined value by the rectified HF voltage.

Figure 5:
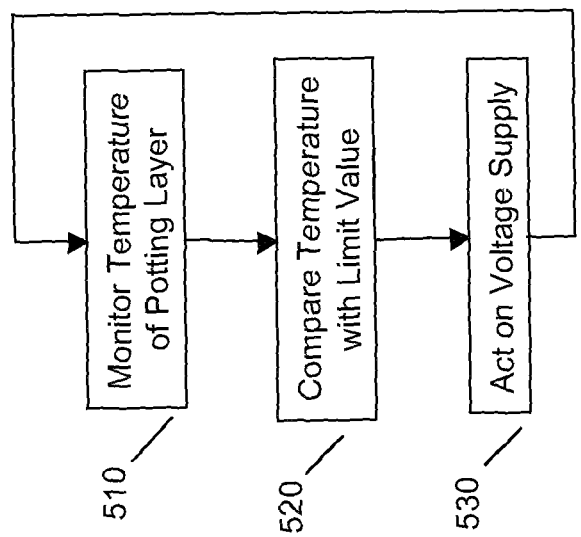
FIG. 5 illustrates an example method of providing an intrinsically safe radio transmission module.

In FIG. 5 is illustrated an example method according to an embodiment. The entire circuit board may be potted with a heat-conducting potting compound over the components in a minimum layer thickness possible according to an applicable safety standard. The temperature in the potting layer may be measured 510 by at least two independently operating hardware circuits distributed over the circuit board. The measured temperature may be compared 520 with an admissible limit value (predetermined temperature value) of the temperature of the potting compound. The voltage supply of the radio transmission module may be acted on 530 to avoid an excessive power loss upon exceedance of the admissible limit value of the temperature.

Thus, an embodiment provides a radio transmission module that achieves intrinsic safety while maintaining a small size/spatial dimension, which may be used in hazardous work environments, such as work areas that are declared as explosion-protected areas. An embodiment may include one or more of redundant hardware circuits configured to limit power to avoid ignition, and/or circuitry potted to minimum acceptable thickness with redundant temperature measurement and regulation arrangements.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

REFERENCE SIGNS LIST

A antenna
Aa antenna connector
Ab shielding plate
Bgr limiter circuit
GL1, GL2, GL3 RF rectifier
K1, K2, K3 comparator
PCB printed circuit board
P1, P2; P3 RF power measuring module
R1, R2, R3 reference
RF-P RF power stage and receiver stage
Se electronic control unit
T1, T2, T3 temperature sensor
Ue input voltage
Vb1, Vb2 potting area
Vr potting frame

What is claimed is:

1. An arrangement for achieving intrinsic safety of a radio transmission module with an HF power stage (RF-P) and an electronic control unit (Se) on a board for transmitting signals and measured values in an explosion-hazardous area, which includes an external voltage supply, an antenna connector (Aa) and an input connector, characterized in that
at the base of an antenna (A) at least two independently operating hardware circuits (P1, P2, P3) are arranged for rectification of output voltage of the HF power stage (RF-P) and for comparison with a maximum admissible value, each comprising one rectifier circuit (GL1, GL2, GL3) and one comparator (K1, K2, K3) whose outputs are connected via a control circuit (Se) with a limiter circuit (Bgr) for switching off voltage supply or for limiting output power of the radio transmission module to a maximum admissible value.

2. The arrangement according to claim 1, characterized in that
on an entire circuit board components are potted over with a heat-conducting potting compound in a minimum layer thickness possible according to a standard for measuring a temperature in a potting layer and for comparing the measured temperature with an admissible limit value inside the potting compound at least two independently operating hardware circuits distributed over the circuit board each with one temperature measuring circuit (T1, T2, T3) comprising one temperature sensor and one comparator each, whose outputs are connected via the electronic control unit (Se) with the limiter circuit (Bgr) for switching off the voltage supply or for limiting the output power of the radio transmission module to a maximum admissible value to avoid an excess power loss upon exceedance of the admissible limit value of the temperature.

3. The arrangement according to claim 1, characterized in that
to achieve highest intrinsic safety "ia" according to a standard, three independently operating hardware circuits (P1, P2, P3) are arranged for limiting RF output power of the RF power and receiver stage (RF-P).

4. The arrangement according to claim 2, characterized in that
to achieve highest intrinsic safety "ia" according to the standard three independently operating hardware circuits (T1, T2, T3) distributed over a circuit board are arranged for limiting surface temperature of the board.

5. The arrangement according to claim 2, characterized in that
on the back of the board a HF shielding plate (Ab) soldered to the board is arranged around potted components.

6. A method for achieving intrinsic safety of a radio transmission module with an HF power stage (RF-P) and an electronic control unit (Se) on a board for transmitting signals and measured values in an explosion-hazardous area, characterized by the following steps:
monitoring HF output power at an antenna (A) by at least two independently operating hardware circuits (P1, P2, P3) by
rectifying HF output voltage;
comparing the rectified HF voltage with a maximum admissible value;
acting on voltage supply of the radio transmission module to avoid an excessive ignition energy upon exceedance of the rectified HF voltage and/or
potting an entire circuit board with a heat-conducting potting compound over components in a minimum layer thickness possible according to a standard;
measuring a temperature in the potting layer by at least two independently operating hardware circuits (T1, T2, T3) distributed over the circuit board;
comparing the measured temperature with an admissible limit value of the temperature inside the potting compound; and
acting on the voltage supply of the radio transmission module to avoid an excessive power loss upon exceedance of the admissible limit value of the temperature.

7. The method according to claim 6, characterized in that acting on the voltage supply of the radio transmission module is effected by
interruption of the voltage supply, or
limitation to an ignition safe input power.

8. An apparatus for transmitting signals in an explosion-hazardous area with intrinsic safety, comprising:
a radio transmission module having a high frequency module and an electronic control circuit disposed on a printed circuit board, said electronic control circuit being configured to control a voltage supply to the high frequency module in response to one or more of:
output voltage of the high frequency module exceeding a predetermined voltage value, as independently measured by at least two independently operating hardware circuits; and
a temperature of a heat-conducting potting compound potted over heat generating components disposed on the printed circuit board exceeding a predetermined temperature value, as independently sensed by at least two independently operating temperature circuits.

9. The apparatus of claim 8, wherein the electronic control circuit is configured to control a voltage supply to the high frequency module in response to both of the output voltage of the high frequency module and the temperature of the heat-conducting potting compound.

10. The apparatus of claim 8, wherein said at least two independently operating hardware circuits each comprise:
   a rectifier circuit for rectifying said output voltage;
   and a comparator for comparing rectified output voltages;
   and further wherein outputs of each of the at least two independently operating hardware circuits are operatively connected to the electronic control circuit.

11. The apparatus of claim 8, further comprising a limiter circuit configured limit output power of the radio transmission module responsive to the output voltage value exceeding the predetermined voltage value.

12. The apparatus of claim 8, wherein said at least two independently operating hardware circuits comprise three independently operating hardware circuits.

13. The apparatus of claim 8, wherein the at least two independently operating temperature circuits are configured to compare the temperature of said heat-conducting potting compound with the predetermined temperature value.

14. The apparatus of claim 13, wherein said at least two independently operating temperature circuits each comprise a comparator, wherein outputs of each of the at least two independently operating temperature circuits are operatively connected to the electronic control unit.

15. The apparatus of claim 8, wherein, the electronic control circuit is configured to, responsive to a determination that the temperature of the heat-conducting potting compound exceeds the predetermined temperature value, limit output power of the radio transmission module to prevent the temperature of the heat-conducting potting compound from exceeding a maximum admissible temperature value.

16. The apparatus of claim 8, wherein the at least two independently operating temperature circuits comprise three independently operating temperature circuits.

17. The apparatus of claim 8, further comprising a shielding plate.

18. The apparatus of claim 8, wherein said heat-conducting potting compound is potted over said heat generating components at a minimum permissible thickness according to intrinsic safety.

19. The apparatus of claim 18, wherein said heat-conducting potting compound is potted over all of the printed circuit board.

* * * * *